United States Patent [19]

Urry

[11] 4,184,007
[45] Jan. 15, 1980

[54] NONAQUEOUS BATTERY CONSTRUCTION

[75] Inventor: Lewis F. Urry, Columbia Station, Ohio

[73] Assignee: Union Carbide Corporation, New York, N.Y.

[21] Appl. No.: 969,878

[22] Filed: Dec. 15, 1978

[51] Int. Cl.² .......................................... H01M 14/00
[52] U.S. Cl. .................................... 429/8; 429/48; 429/101; 429/149; 429/178; 429/196; 429/121
[58] Field of Search ................................ 429/101–105, 429/8, 48, 149–155, 178, 196, 121

[56] References Cited

U.S. PATENT DOCUMENTS

| | | | |
|---|---|---|---|
| 2,542,934 | 2/1951 | MacFarland | 136/133 |
| 3,082,285 | 3/1963 | Stark, Jr. | 136/133 |
| 3,542,602 | 11/1970 | Gabano | 136/155 |
| 3,663,721 | 5/1972 | Blondel et al. | 136/6 |
| 3,736,190 | 5/1973 | Dey et al. | 136/133 |
| 3,880,673 | 4/1975 | Buhrer | 136/173 |
| 3,929,507 | 12/1975 | Bro et al. | 136/114 |
| 3,993,501 | 11/1976 | Kalmoki-Kis | 429/48 |
| 4,032,696 | 6/1977 | Urry | 429/201 |
| 4,048,389 | 9/1977 | Bubnick | 429/101 |
| 4,087,595 | 5/1978 | Mallery | 429/153 |

Primary Examiner—Charles F. LeFevour
Attorney, Agent, or Firm—Cornelius F. O'Brien

[57] ABSTRACT

Battery comprising a container housing a plurality of sealed cells employing an oxyhalide-, halide- and/or liquid sulfur dioxide-containing nonaqueous electrolyte, and a porous shock absorbing material impregnated with an immobilizing agent which will react with and neutralize any oxyhalide, halide, liquid sulfur dioxide or their reaction products that escape from the cells.

13 Claims, 9 Drawing Figures

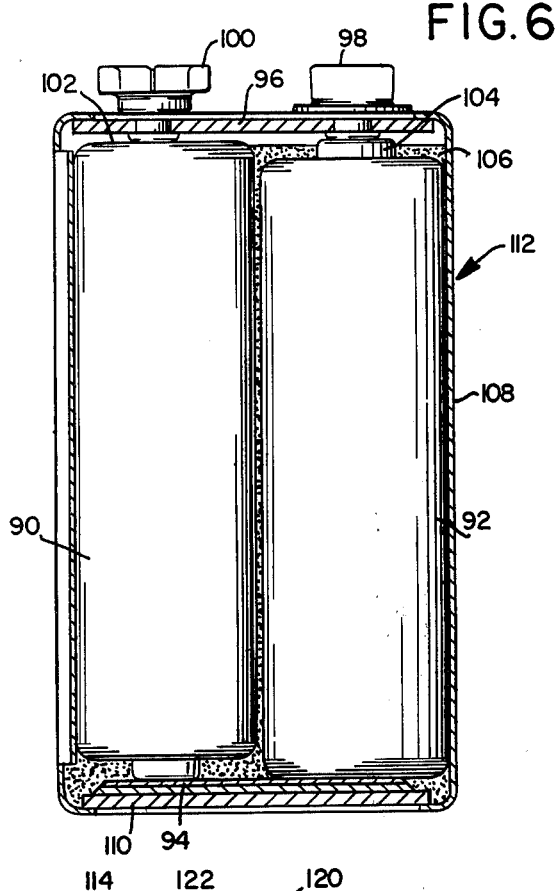
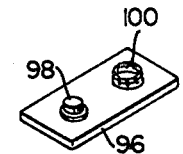
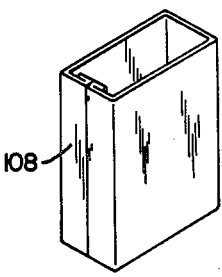
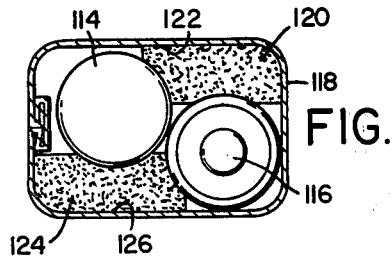
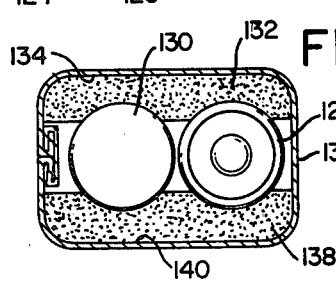
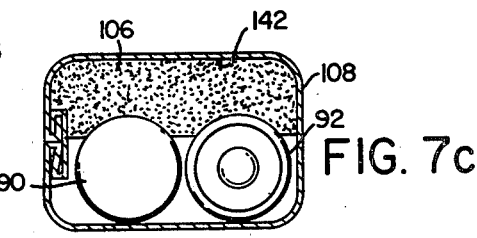

NONAQUEOUS BATTERY CONSTRUCTION

FIELD OF THE INVENTION

The invention relates to a battery comprising a plurality of non-aqueous oxyhalide, halide, and/or liquid sulfur dioxide sealed cells encased in a container along with a resilient shock absorbing material impregnated with a chemical that will react with and neutralize any of the oxyhalide, halide, liquid sulfur dioxide and/or their reaction products that escape from any of the cells thereby containing and neutralizing any leakage from the cells within the battery's container.

BACKGROUND OF THE INVENTION

The continuing development of portable electrically powered devices such as tape recorders and playback machines, radio transmitters and receivers, and the like, create a continuing demand for the development of reliable, long service life cells or batteries for their operations. Recently developed electrochemical cell systems that will provide a long service life utilize highly reactive anode materials such as lithium, sodium and the like, in conjunction with high energy density non-aqueous liquid cathode materials and a suitable salt.

It has recently been disclosed in the literature that certain materials are capable of acting both as an electrolyte carrier, i.e., as solvent for the electrolyte salt, and as the active cathode for a nonaqueous electrochemical cell. U.S. application Ser. No. 439,521 by G. E. Blomgren et al filed Feb. 4, 1974, which is a continuation-in-part of application Ser. No. 212,582 filed on Dec. 27, 1971, now abandoned, discloses a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer comprises a liquid oxyhalide of an element of Group V or Group VI of the Periodic Table. The "Periodic Table" is the Periodic Table of Elements as set forth on the inside back cover of the Handbook of Chemistry and Physics, 48th Edition, The Chemical Rubber Co., Cleveland, Ohio, 1967–1968. For example, such nonaqueous cathode materials would include sulfuryl chloride, thionyl chloride, phosphorus oxychloride, thionyl bromide, chromyl chloride, vanadyl tribromide and selenium oxychloride.

Another class of liquid cathode materials would be the halides of an element of Group IV to Group VI of the Periodic Table. For example such nonaqueous cathode material would include sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribomide chloride.

It has been found that when employing high energy density liquid cathode materials in nonaqueous cell systems, the cells exhibit higher voltages than cells employing conventional aqueous systems which results in fewer cell units being required to operate a particular battery-powered device. In addition, many of the oxyhalide and halide nonaqueous cells display relatively flat discharge voltage-versus-time curves. Thus these cells can be employed to produce batteries that will provide a working voltage closer to a designated cutoff voltage than is practicable with some conventional aqueous systems which generally do not exhibit flat discharge voltage-versus-time curves.

However, one possible disadvantage to the use of oxyhalide and halide liquid cathode nonaqueous cells is that if the seal of the cell is not sufficiently secured then it may be possible that during storage or use, some of the oxyhalide, halide or their reaction products may escape from the cell. This escape of liquids and/or gases could cause damage to the device employing the cell or to the surface of a compartment or shelf where the cell is stored.

It is therefore an object of this invention to provide a battery comprising two or more oxyhalide, halide, and/or liquid sulfur dioxide nonaqueous cells encased within a container along with a resilient material impregnated with a chemical that will react with and neutralize any of the oxyhalide, halide, liquid sulfur dioxide and/or their reaction products that escape from any of the cells.

Another object of the present invention is to provide a battery comprising a plurality of oxyhalide halide and/or liquid sulfur dioxide nonaqeuous cells and having means for neutralizing any material that escapes from the cells.

Another object of the present invention is to provide a battery comprising a plurality of oxyhalide, halide, liquid sulfur dioxide nonaqueous cells disposed within a container along with a resilient material that is impregnated with a chemical that will react with and neutralize any material that may escape from any of the cells.

Another object of the present invention is to provide a battery that has a high energy density output and that will be free of any external leakage of materials.

The foregoing and additional objects will become more fully apparent from the description hereinafter and the accompanying drawings.

SUMMARY OF THE INVENTION

The invention relates to a battery comprising an outer container having an opening at the top and a closed base member; disposed within said container at least two nonaqueous cells employing an electrolyte solution containing at least a liquid selected from the group consisting of an oxyhalide, a halide, liquid sulfur dioxide and mixtures thereof, said cells electrically connected in predetermined electrical relation so as to provide two electrode terminals for the cell assembly disposed at the open end of the container; a terminal board having two external terminals exposed on its surface and being secured to the open end of the container, each of said external terminals being electrically connected to one of two electrode terminals of the cell assembly; and a resilient material disposed within the container between the cells and at least a portion of an inner wall of the container, said resilient material containing an immobilizing agent that will substantially react with and neutralize any of the oxyhalide, halide, liquid sulfur dioxide, mixtures thereof or their reaction products that escape from any of the cells. Specifically, the resilient material should be sufficiently porous so as to be capable of being impregnated with a chemical that will react with and neutralize the materials escaping from the cells.

The resilient material for use in this invention can be selected from the group consisting of open celled plastic foam, pressed or felted fibers, thick woven fabric, corrugated board, particulate materials and the like. The immobilizing agent-containing resilient material will serve as a spacer, a shock absorber and an immobilizer for any escaping material from the cells.

The unit cell for use in this invention can be the split internal anode/outer cathode collector construction as described in U.S. Pat. No. 4,032,696, or the split internal cathode collector construction as described in U.S. Pat. No. 4,048,389, said U.S. Pat. Nos. 4,032,696, and 4,048,389 being incorporated herein by reference.

Suitable nonaqueous liquid cathode materials for use in the cell employed in this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 48th Edition, The Chemical Rubber Co., Cleveland, Ohio, 1967–1968. For example, such non-aqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribomide chloride. Another suitable cathode material would be liquid sulfur dioxide.

The anode for use in the cells employed in this invention can be generally consumable metals and include the alkali metals, alkaline earth metals and alloys of alkali metals or alkaline earth metals with each other and other metals. The term "alloy" as used herein is intended to include mixtures; solid solutions such as lithium-magnesium; and intermetallic compounds such as lithium monoaluminide. The preferred anode materials are the alkali metals and particularly lithium, sodium and potassium. When using lithium anodes the anode may be coated with a vinyl resin as disclosed in U.S. Pat. No. 3,993,501, said patent incorporated herein by reference.

The cathode collector for use in cells suitable for this invention has to be electronically conductive so as to permit external electrical contact to be made with the active cathode material and also provide extended area reaction sites for the cathodic electrochemical process of the cell. Materials suitable for use as a cathode collector are carbon materials and metals, such as nickel, with acetylene black being preferable. In addition, the cathode collector when made of a particulate material should be capable of being molded directly within a can or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials. Suitable binder materials for this purpose may include polyvinyl, polyethylene, polypropylene, polyacrylics, polystyrene and the like. For example, polytetrafluoroethylene would be the preferred binder for cathode collectors for use with liquid oxyhalide cathodes. The binder, if required, should be added in an amount between about 5% and about 30% by weight of the molded cathode collector since an amount less than 5% would not provide sufficient strength to the molded body while an amount larger than 30% would wetproof the surface of the carbon and/or reduce the available surface of the carbon, thereby reducing the activation site areas required for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

The solute for use in the cells suitable for this invention may be a simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December, 1938, pages 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride, and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride, and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3,-dioxolane, 3-methyl-2-oxazolidone, propylene carbonate, γ-butyrolactone, sulfolane ethylene glycol sulfite, dimethyl sulfite, benzoyl chloride, dimethoxyethane, dimethyl isoxazole, diethyl carbonate, sulfur dioxide and the like.

Suitable separators for use with liquid cathodes in nonaqueous cells suitable for use in this invention are the non-woven glass separators, preferably those separators that incorporate long glass fibers along with the short glass fibers since such a combination increases the tear strength of the separators thereby making them easier to handle.

The container of the battery could be made of stainless steel, iron, nickel, plastic, coated metals or some other suitable material.

Some preferred combinations of nonaqueous cathode materials and anodes would be as follows:
(1) sulfuryl chloride/Li or Na;
(2) thionyl chloride/Li or Na;
(3) phosphorus oxychloride/Li or Na;
(4) sulfur monochloride/Li or Na;
(5) sulfur monobromide/Li or Na;
(6) selenium tetrafluoride/Li or Na.

Preferably, the cells for use in this invention would be liquid oxyhalide cells using sulfuryl chloride, thionyl chloride or mixtures thereof with a lithium anode.

The resilient material should have about 40 percent porosity or more so as to be capable of absorbing or containing a suitable immobilizing agent. Preferably the resilient material should have a porosity between about 50 and about 80 percent.

When employing nonaqueous cells utilizing thionyl chloride ($SOCl_2$) and/or sulfuryl chloride ($SO_2Cl_2$) as the cathode, then a suitable material such as sodium acid carbonate ($NaHCO_3$) can be used as the immobilizing agent, since it will absorb and chemically convert to harmless and stable products any thionyl chloride, sulfuryl chloride or their reaction products that may escape from the cell. Specifically, the chemical reaction that is believed to occur would be as follows:

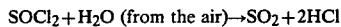

$SOCl_2 + H_2O$ (from the air)$\rightarrow SO_2 + 2HCl$

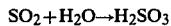

$SO_2 + H_2O \rightarrow H_2SO_3$

$2NaHCO_3 + H_2SO_3 \rightarrow 2CO_2 \uparrow + Na_2SO_3 + 2H_2O$

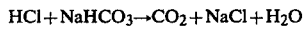

$HCl + NaHCO_3 \rightarrow CO_2 + NaCl + H_2O$

Other immobilizing agents that can be employed in the invention include sodium carbonate, potassium carbonate, trisodium phosphate, magnesium oxide, magnesium carbonate, magnesium hydroxide, calcium hydroxide, calcium carbonate, and the like.

A preferred embodiment of the invention would and should employ unit cells equipped with a pressure relief valve so that any excessively pressurized gas in the cells can be released from the cells into the battery container where it can be absorbed and chemically converted to stable immobile products by the immobilizing agent. If the gases were to escape from the battery, then they could possibly cause damage to the component in which it is used. In fact, if the battery were subjected to abuse conditions, such as charging, then any material that would evolve and escape from the unit cells could be converted to stable, immobile products within the battery container without causing any damage to the device in which the battery is used.

In cell systems where gas escaping problems can be anticipated, then additional resilient material in particulate form or in situ foaming material should be added to substantially fill any remaining voids in the battery container so as to effectively insure that any escaping gas from the cells will contact the resilient impregnated material.

The present invention will become apparent from the following description thereof when considered together with the accompanying drawings which are set forth as being exemplary of embodiments of the present invention and are not intended, in any way, to be limitative thereof and wherein:

FIG. 5 is an exploded view of a battery made in accordance with this invention.

FIG. 6 is vertical cross-sectional view of a fully assembled battery made in accordance with this invention.

FIGS. 7a, 7b and 7c are horizontal cross-sectional views of various embodiments of a battery made in accordance with this invention.

Figure 1:
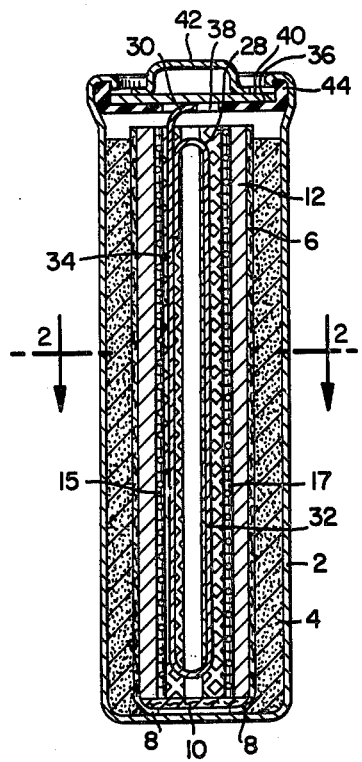
FIG. 1 is a vertical cross-sectional view of a fully assembled electrochemical cell for use in accordance with this invention.

Referring in detail to FIG. 1, there is shown a cross-sectional view of a cylindrical cell comprising a cylindrical container 2 having disposed therein a cathode collector shell 4 in contact with the inner upstanding circumference of the container 2 thereby adapting the container as the cathodic or positive terminal for the cell. Disposed within and in contact with the inner circumference of cathode collector 4 is a separator liner 6 with its bottom separator or disc 10. If desired, the cathode collector material could be extruded within the container 2, rolled with the can material or composed of one or more segments to form a cylindrical tube and then placed in the can.

Figure 2:
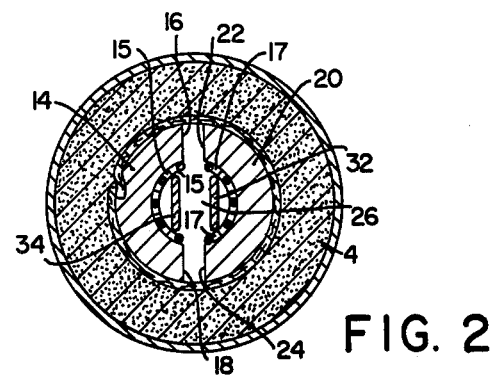
FIG. 2 is an enlarged horizontal cross-sectional view taken along line 2—2 of FIG. 1.

A two member anode 12 is shown in FIGS. 1 and 2 comprising a first half cylindrical annular member 14 having flat end faces 16 and 18 and a second half cylindrical annular member 20 having flat end faces 22 and 24. When the flat end faces of each cylindrical half member are arranged in an opposing fashion as shown in FIGS. 1 and 2, an axial opening 26 is defined between the cylindrical half annular members 14 and 20.

If desired, arcuate type backing sheets 15 and 17, such as inert electrically conductive metals screens or grids, could be disposed against the inner surface wall of the anode bodies 14 and 20 respectively, to provide uniform current distribution over the anode. This will result in a substantial uniform consumption or utilization of the anode while also providing a substantial uniform spring pressure over the inner wall surface of anode as will be discussed below.

An electrically conductive spring strip 28 is appropriately bent into a flattened elliptically shaped member having an extending end 30. When inserting the spring strip 28 into a container the legs 32, 34 of the conductive strip 28 are squeezed together and forced into the axial opening between the two screen backed anode members arranged in a container as shown in FIGS. 1 and 2. The inserted conductive spring strip 28 resiliently biases the two anode members 14 and 20 via backing screens 15 and 17 so as to provide a substantially uniform and continuous pressure contact over the inner wall of the anode members. The extended end 30 of spring strip 28 is shown projected above the surface of anode members 14 and 20. An insulator disc 36 has a central opening 38 through which the projected end 30 of the spring strip 28 passes, whereupon the end 30 is then welded to a two part cover 40 and 42 thereby adapting the two-piece cover 40-42 as anodic or negative terminal of the cell. Before closing the cell, the cathode-electrolyte comprising a suitable salt dissolved in an oxyhalide, halide with a cosolvent or mixtures thereof can be dispensed in opening 26 whereupon it can permeate through the anode, separator and cathode collector of the cell. In addition, the separator could be presoaked with the cathode-electrolyte prior to being inserted into the cell.

The insulating disc 36 has a peripheral depending skirt 44 disposed between cover 40 and the upper inner wall of container 2 for sealing the cell through conventional crimping techniques.

Figure 3:
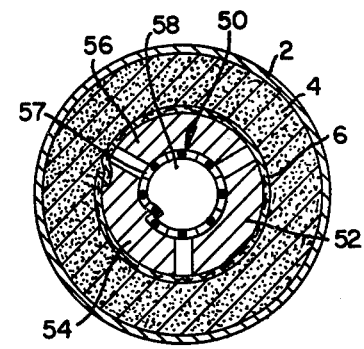
FIG. 3 is an enlarged horizontal cross-sectional view of another embodiment of a cell for use in accordance with this invention.

Another embodiment of an anode is shown in FIG. 3 along with several identical components and identified with the same reference numbers as shown in FIGS. 1 and 2. Specifically, a three-member anode 50 is shown which comprises a first arcuate member 52, a second arcuate member 54 and a third arcuate member 56, each of which has an arc measurement of about 120°. When the longitudinal flat end faces of the arcuate bodies 52, 54 and 56 are arranged in an opposing fashion as shown in FIG. 3, an axial opening 58 is defined between said members. Thus when this three-member anode is inserted into a container with a coiled spring member 57 inserted into the axial opening 58 defined by said anode members, the coiled spring member 57 will resiliently bias the anode arcuate members against the separator 6 of the cell which in turn contacts the cathode collector 4 of the cell 2 thereby maintaining good physical contact between these components.

Figure 4:
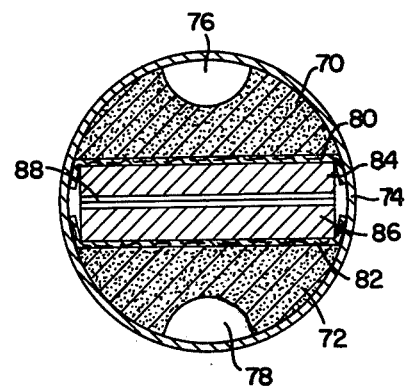
FIG. 4 is an enlarged horizontal cross-sectional view of still another embodiment of a cell for use in accordance with this invention.

Another embodiment of a two-member anode according to this invention is shown in FIG. 4. Specifically, semi-cylindrical cathode collector members 70, 72 are shown disposed within a cylindrical container 74 and having longitudinal semi-circular grooves 76 and 78, respectively, imparted in their curved outer surfaces that face the internal wall of the can 74. Disposed adjacent and in contact with each of the longitudinal flat surfaces of members 70 and 72 are separators 80 and 82, respectively. Disposed within the opening defined by the separators 80 and 82 is an anode composed of two elongated rectangular members 84 and 86 which are forced apart by a folded compressed spring member 88 disposed between said anode members 84 and 86. This spring member 88 biases the anode members 84 and 86 against the separator 80 and 82, respectively, which in turn is held against cathode collectors 70 and 72, respectively, thereby maintaining good contact between these components. Openings 76 and 78 can act as reservoirs for the cathode-electrolyte of the cell.

In the above described cells, the anode and cathode collector could be interchanged where possible, such that the anode would be disposed adjacent the inner wall of the cell's container and the cathode collector would be disposed within the anode and separated therefrom by a suitable separator as described above.

FIG. 5 shows several parts of the battery ready for assembly. Specifically, cells 90,92 of the type shown in FIG. 1 are aligned and oriented so that when the cells contact conductive strip 94, the cells will be connected in series. A typical battery terminal board 96 is provided with external terminals 98 and 100 such that when the battery is assembled the terminals will make electrical contact with the terminals 102 and 104 of the series-connected cells 90, 92. A resilient material 106 impregnated with a suitable immobilizing agent as discussed above is positioned so as to be disposed between the cells 90 and 92 and the inner wall of container 108. A bottom insulating board 110 is positioned adjacent the conductive strip 94 and then all the components are placed within the container 108 and the top and bottoms edges of container 108 are crimped around the terminal board 96 and bottom board 110, respectively, to complete assembly of the battery.

FIG. 6, a vertical cross-section of the battery 112, is shown with the cells 90, 92 connected in series via conductive strip 94 with the terminals 102 and and 104 electrically connected to external terminals 100 and 98, respectively, of terminal board 96. Also shown in FIG. 6 is the top edge of container 108 crimped around terminal board 96 with the bottom edge crimped around bottom board 110. Terminal board 96 and bottom board 110 could be made of pressed wood, phenolic board, hard plastics such as polypropylene or the like.

FIG. 7a shows a horizontal cross-sectional view of another embodiment of this invention. Specifically, cells 114 and 116 are disposed diagonally within the container 118 with a portion of the resilient material 120 positioned adjacent cell 116 and the inner wall 122 of container 118 while a second portion of resilient material 124 is positioned adjacent cell 114 and the opposite inner wall 126 of container 118. This embodiment can accommodate the largest diameter cells for a given container size.

FIG. 7b shows a horizontal cross-sectional view of another embodiment of this invention. Specifically, cells 128 and 130 are aligned with a first portion of the resilient material 132 disposed between cells 128,130 and the inner wall 134 of container 136 while a second portion of resilient material 138 is disposed between cells 128,130 and the opposite inner wall 140 of container 136.

FIG. 7c shows a horizontal cross-sectional view of another embodiment of the invention 6. Specifically, cells 90 and 92 are aligned with the resilient material 106 disposed between cells 90,92 and the inner wall 142 of container 108.

As apparent from FIGS. 7a through 7c, particulate material such as diatomaceous earth, glass spheres, sand and the like, foamable materials such as polyurethane, polystyrene and the like, or any other suitable material such as the powdered or cast immobilizing agent could be added to substantially fill the remaining voids within the battery container, when desired.

The immobilizing agent can be added in any convenient manner such as by impregnating the resilient material from a solution of the immobilizing agent, by mechanical methods such as pouring or placing the immobilizing agent in the battery container or by foaming in situ the resilient material containing the immobilizing agent therein.

The following examples are illustrative of the present invention and are not intended in any manner to be limitative thereof.

EXAMPLE 1

Two batteries made in accordance with FIG. 1, 2, 5 and 7a employed cells using the following components:
anode of lithium
cathode collector of teflon-bonded acetylene blocks
cathode-electrolyte of a mixture of thionyl and
sulfuryl chloride containing 1 M $LiAlCl_4$ Two such cells measuring 0.475 inch diameter and 1.63 inches long were assembled in a container measuring 1 15/16 inches by 1 1/32 inches by 11/16 inch. Two resilient strips of polyurethane foam material measuring 1.5 inches by 0.5 inch by ⅜ inch thick were impregnated with $Na_2CO_3$ and assembled in the battery as shown in FIG. 7a.

The batteries were then dropped about sixty feet onto a concrete pavement. Thereafter the batteries were discharged in a normal fashion and no effect on their performance was observed. Thus the batteries made in accordance with this invention showed the effectiveness of the shock-absorbing features obtained through the use of the resilient material.

Modifications may be made in the construction details and in the arrangements of the related components without departing from the spirit of the invention as set forth in the appended claims.

What is claimed is:

1. A battery comprising an outer container having an opening at the top and a closed base member; disposed within said container at least two nonaqueous cells employing an electrolyte solution containing at least a liquid selected from the group consisting of an oxyhalide, a halide, liquid sulfur dioxide and mixtures thereof, said cells electrically connected in predetermined electrical relation so as to provide two electrode terminals for a cell assembly disposed at the open end of the container; a terminal board having two external terminals exposed on its surface and being secured to the open end of the container, each of said external terminals being electronically connected to one of the two electrode terminals of the cell assembly; and a resilient material disposed within the container between the cells and at least a portion of an inner wall of the container, said resilient material containing an immobilizing chemical agent that will substantially react with and neutralize any of the oxyhalide, halide, liquid sulfur dioxide, mixtures thereof or their reaction products that escape from any of the cells.

2. The battery of claim 1 wherein the resilient material is selected from the group consisting of plastic foam, pressed fibers, felted fibers, woven fabric, corrugated board, and particulate materials.

3. The battery of claim 1 wherein two cells are positioned in the container and wherein a first portion of the resilient material is positioned between one of the inner walls of the container and one of the cells and a second portion of the resilient material is positioned between the opposite inner wall of the container and the other cell.

4. The battery of claim 1 wherein two cells are positioned in the container and wherein the resilient material is positioned between one of the inner walls of the container and the two cells.

5. The battery of claim 1 wherein two cells are positioned in the container and wherein a first portion of the resilient material is positioned between one of the walls of the container and the two cells and wherein a second portion of the resilient material is positioned between the opposite inner wall of the container and the two cells.

6. The battery of claim 1 wherein the cells employ an electrolyte containing sulfuryl chloride, thionyl chloride or mixtures thereof and wherein the resilient material is impregnated with an immobilizing agent selected from the group consisting of sodium acid carbonate, sodium carbonate, potassium carbonate, trisodium phosphate, magnesium oxide, magnesium carbonate, magnesium hydroxide, calcium hydroxide, and calcium carbonate.

7. The battery of claim 6 wherein the immobilizing agent is sodium acid carbonate.

8. The battery of claim 6 wherein two cells are positioned in the container and wherein a first portion of the resilient material is positioned between one of the inner walls of the container and one of the cells and a second portion of the resilient material is positioned between the opposite inner wall of the container and the other cell.

9. The battery of claim 6 wherein two cells are position in the container and wherein the resilient material is positioned between one of the inner walls of the container and the two cells.

10. The battery of claim 6 wherein two cells are positioned in the container and wherein a first portion of the resilient material is positioned between one of the walls of the container and the two cells and wherein a second portion of the resilient material is positioned between the opposite inner wall of the container and the two cells.

11. The battery of claim 6 wherein the resilient material is polyurethane foam and the immobilizing agent is sodium acid carbonate.

12. The battery of claim 1 wherein a particulate material is added to substantially fill any voids within the container.

13. The battery of claim 1 wherein a foamable material is added to substantially fill any voids within the container.

* * * * *